(12) United States Patent
Kitanaka

(10) Patent No.: US 8,269,451 B2
(45) Date of Patent: Sep. 18, 2012

(54) POWER CONVERSION DEVICE

(75) Inventor: Hidetoshi Kitanaka, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 326 days.

(21) Appl. No.: 12/746,297

(22) PCT Filed: Jan. 10, 2008

(86) PCT No.: PCT/JP2008/050210
§ 371 (c)(1),
(2), (4) Date: Jun. 4, 2010

(87) PCT Pub. No.: WO2009/087775
PCT Pub. Date: Jul. 16, 2009

(65) Prior Publication Data
US 2010/0253267 A1    Oct. 7, 2010

(51) Int. Cl.
*H02H 7/10* (2006.01)
*H02H 7/122* (2006.01)
*H02H 3/00* (2006.01)
*H02H 3/08* (2006.01)

(52) U.S. Cl. ............ 318/801; 318/434; 363/55; 361/30; 361/31

(58) Field of Classification Search .......... 318/798–815, 318/434; 361/23, 30, 31, 33, 79; 363/50, 363/54, 55; 307/31, 35
See application file for complete search history.

(56) References Cited

U.S. PATENT DOCUMENTS

| | | | |
|---|---|---|---|
| 6,278,256 B1 | 8/2001 | Aoyama | |
| 6,856,137 B2 * | 2/2005 | Roden et al. | 324/509 |
| 7,079,406 B2 * | 7/2006 | Kurokami et al. | 363/56.03 |
| 7,557,583 B2 * | 7/2009 | Zettel et al. | 324/418 |
| 8,040,081 B2 * | 10/2011 | Shimana | 318/34 |
| 8,049,455 B2 * | 11/2011 | Kitanaka | 318/563 |
| 8,146,513 B2 * | 4/2012 | Ibaiondo Madariaga et al. | 104/289 |

(Continued)

FOREIGN PATENT DOCUMENTS

JP    54-132776 A    10/1979

(Continued)

OTHER PUBLICATIONS

Office Action (Decision on Grant) dated Aug. 8, 2011, issued in the corresponding Russian Patent Application No. 2010133444, and an English Translation thereof.

(Continued)

*Primary Examiner* — Eduardo Colon
(74) *Attorney, Agent, or Firm* — Buchanan Ingersoll & Rooney PC

(57) ABSTRACT

A power conversion device includes: an inverter that drives an alternating-current motor by converting a direct-current voltage into an alternating-current voltage of an arbitrary frequency; an alternating current disconnecting switching unit connected between the inverter and the alternating-current motor; a current detector that detects an output current of the inverter; and a controller that performs on/off-control of the plural switching elements in the inverter and switching control with respect to the switching unit, based on at least a current detected by the current detector. The controller has a configuration to be able to interrupt a fault current by setting the fault current to a state of generating a current zero point, when the fault current containing a direct-current component is generated between the inverter and the alternating-current motor.

6 Claims, 6 Drawing Sheets

U.S. PATENT DOCUMENTS

| | | | |
|---|---|---|---|
| 2003/0067723 A1* | 4/2003 | Suzui et al. | 361/42 |
| 2006/0198068 A1* | 9/2006 | Takahashi et al. | 361/42 |
| 2006/0224360 A1* | 10/2006 | Kishimoto | 702/183 |
| 2007/0093359 A1 | 4/2007 | Kobayashi et al. | |
| 2010/0010684 A1* | 1/2010 | Lorenz et al. | 700/293 |

FOREIGN PATENT DOCUMENTS

| | | |
|---|---|---|
| JP | 62-018984 A | 1/1987 |
| JP | 7-75255 A | 3/1995 |
| JP | 8-182105 A | 7/1996 |
| JP | 10-313546 A | 11/1998 |
| JP | 2006-050803 A | 2/2006 |
| JP | 2006-311692 A | 11/2006 |
| JP | 2007-118680 A | 5/2007 |
| SU | 875568 | 10/1981 |

OTHER PUBLICATIONS

Korean Decision of a Patent Grant dated Mar. 28, 2012, in the corresponding Korean Patent application No. 10-2010-7014566. (2 pages).

International Search Report for PCT/JP2008/050210 completed Mar. 18, 2008.

Written Opinion for PCT/JP2008/050210 completed Mar. 18, 2008.

* cited by examiner

POWER CONVERSION DEVICE

TECHNICAL FIELD

The present invention relates to a power conversion device suitable to drive a permanent-magnet synchronous motor incorporated in an electric vehicle.

BACKGROUND ART

A permanent-magnet synchronous motor (hereinafter, simply "motor", except when specific distinction is necessary) has been known as a highly efficient motor, and has the following characteristics: the motor does not require an excitation current because a magnetic flux is established based on a permanent magnet incorporated in a rotor, as compared with conventional induction motors widely used in various fields; and any secondary copper loss does not occur in the motor because a current does not flow to a rotor like the induction motor. While an induction motor is also conventionally used in electric vehicles, application of a permanent-magnet synchronous motor has been examined in recent years to improve its efficiency.

Generally, in an electric vehicle that runs with plural cars connected to each other, each incorporating a power conversion device and a motor, the electric vehicle can continue running by using sound power conversion devices and motors, even when a line to line fault occurs in a power conversion device in a part of the cars during running. As a result, because the motor connected to a power conversion device having the fault is kept driven at a wheel side, a short-circuit current continues flowing at an induced voltage of the motor at a fault portion (a line to line fault portion) of the power conversion device having a short-circuit fault.

Therefore, when this state is left as it is, there is a risk that the damage of the fault portion of the power conversion device further advances due to the heat by a short-circuit current or causes heat or burn of the fault portion or the motor, and this state is not desirable.

As a countermeasure against such cases, for example, Patent Document 1 discloses the following method. A contactor as a switching unit that electrically disconnects the connection between an inverter and a motor is provided to avoid expansion of a damage of the inverter at an induced voltage of the motor, when the inverter in a power conversion device that drive-controls a permanent synchronous motor is in a fault during running of an electric vehicle. When a controller detects a fault of the inverter, the controller open-circuit-controls the contactor, and electrically disconnects the inverter from the motor.

Patent Document 1: Japanese Patent Application Laid-open No. H8-182105

As is generally known, a sinusoidal alternating current generates a current zero point at each half cycle of a current wave. Therefore, a current can be interrupted by using the current zero point. The contactor described in Patent Document 1 mentioned above is an alternating current disconnecting contactor that interrupts a current by using the current zero point. Generally, types of the contactor to interrupt an alternating current include a vacuum contactor and the like using a system of interrupting a current at a current zero point.

DISCLOSURE OF INVENTION

Problem to be Solved by the Invention

However, the present inventor has found that, depending on a state of a fault occurred in a power conversion device, a fault current flowing between an inverter in a power conversion device and a motor contains a direct-current component that does not generate a continuous current zero point. In this case, a vacuum contactor and the like to interrupt an alternating current using the above system of interrupting a current at the current zero point cannot interrupt the current. Therefore, a fault current cannot be interrupted and flows continuously. Consequently, there is a problem that a fault portion of the power conversion device expands due to heat.

The present invention has been achieved in view of the above problems, and an object of the present invention is to obtain a power conversion device capable of interrupting a fault current and capable of preventing expansion of a fault portion in the power conversion device, even when a fault current flowing between an inverter and a motor contains a direct-current component that does not generate a continuous current zero point, regardless of a mode of a fault occurred in the power conversion device.

Means for Solving Problem

In order to attain the above object, in a power conversion device of the present invention including an inverter that includes a plurality of switching elements to be on/off-controlled and drives an alternating-current motor by converting a direct-current voltage into an alternating-current voltage of an arbitrary frequency, an alternating current disconnecting switching unit that is connected between the inverter and the alternating-current motor, a current detector that detects an output current of the inverter, and a controller that performs on/off-control of the switching elements in the inverter and switching control with respect to the switching unit based on at least a current detected by the current detector, the controller has a configuration to be able to interrupt a fault current by setting the fault current to a state of generating a current zero point, when the fault current containing a direct-current component is generated between the inverter and the alternating-current motor.

Effect of the Invention

According to the present invention, regardless of a mode of a fault occurred in a power conversion device, when a fault current flowing between an inverter and a motor contains a direct-current component that does not generate a continuous current zero point, the fault current can be interrupted. Therefore, expansion of a fault portion in the power conversion device can be prevented.

Figure 1:
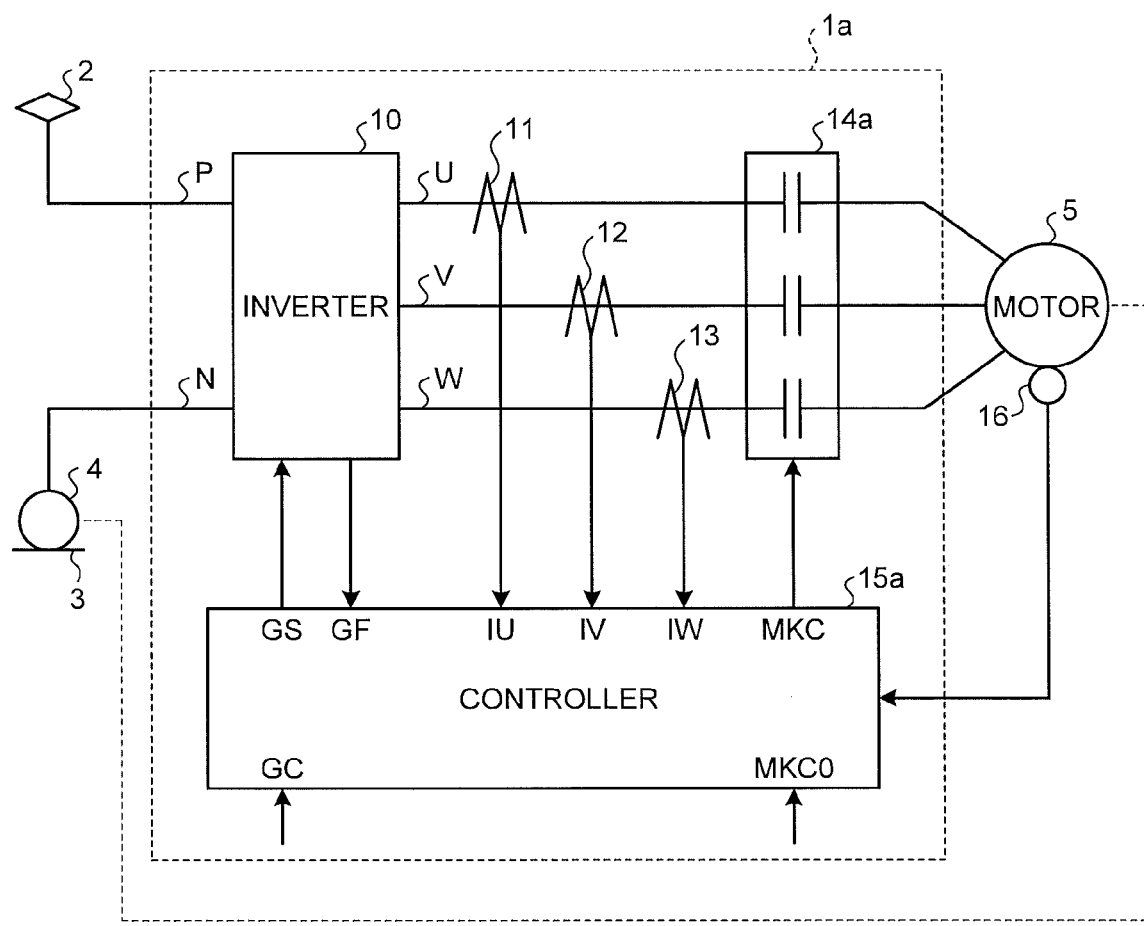
FIG. 1 is a block diagram of a configuration of a power conversion device according to a first embodiment of the present invention that drives a permanent-magnet synchronous motor incorporated in an electric vehicle.

EXPLANATIONS OF LETTERS OR NUMERALS 1a, 1b power conversion device
2 power collector
3 rail
4 wheel
5 alternating-current motor including permanent-magnet synchronous motor
10 inverter
11, 12, 13 current detector
14a alternating current disconnecting contactor
14b contactor capable of interrupting direct-current
15a, 15b controller
16 rotation detector
20 fault determining unit
21 current-zero point detector
22 oscillator
23 counter
24 comparator
25 average processor
26 polarity determining unit
27 comparator
28 determining unit
29a, 29b, 29c processing circuit
30 gate signal generator
40 contactor controller
P positive-electrode-side conductor
N negative-electrode-side conductor
U U-phase conductor
V V-phase conductor
W W-phase conductor
UP U-phase upper-arm element
VP V-phase upper-arm element
WP W-phase upper-arm element
UN U-phase lower-arm element
VN V-phase lower-arm element
WN W-phase lower-arm element

BEST MODE(S) FOR CARRYING OUT THE INVENTION

Exemplary embodiments of a power conversion device according to the present invention will be explained below in detail with reference to the accompanying drawings.

First Embodiment

FIG. 1 is a block diagram of a configuration of a power conversion device according to a first embodiment of the present invention that drives a permanent-magnet synchronous motor incorporated in an electric vehicle. A power conversion device 1a according to the first embodiment shown in FIG. 1 includes an inverter 10, current detectors 11, 12, and 13, a contactor 14a as a switching unit, and a controller 15a, as a basic configuration according to the present invention.

In FIG. 1, among two input terminals of the inverter 10, a positive-electrode-side input terminal is connected to a power collector 2 via a positive-electrode-side conductor P, and a negative-electrode-side input terminal is connected to wheels 4 rotating on a rail 3, via a negative-electrode-side conductor N. With this configuration, a direct current collected from the power collector 2 and the rail 3 via the wheels 4 is input to the inverter 10. The wheels 4 are mechanically coupled with a rotation axis of an alternating-current motor 5.

Figure 2:
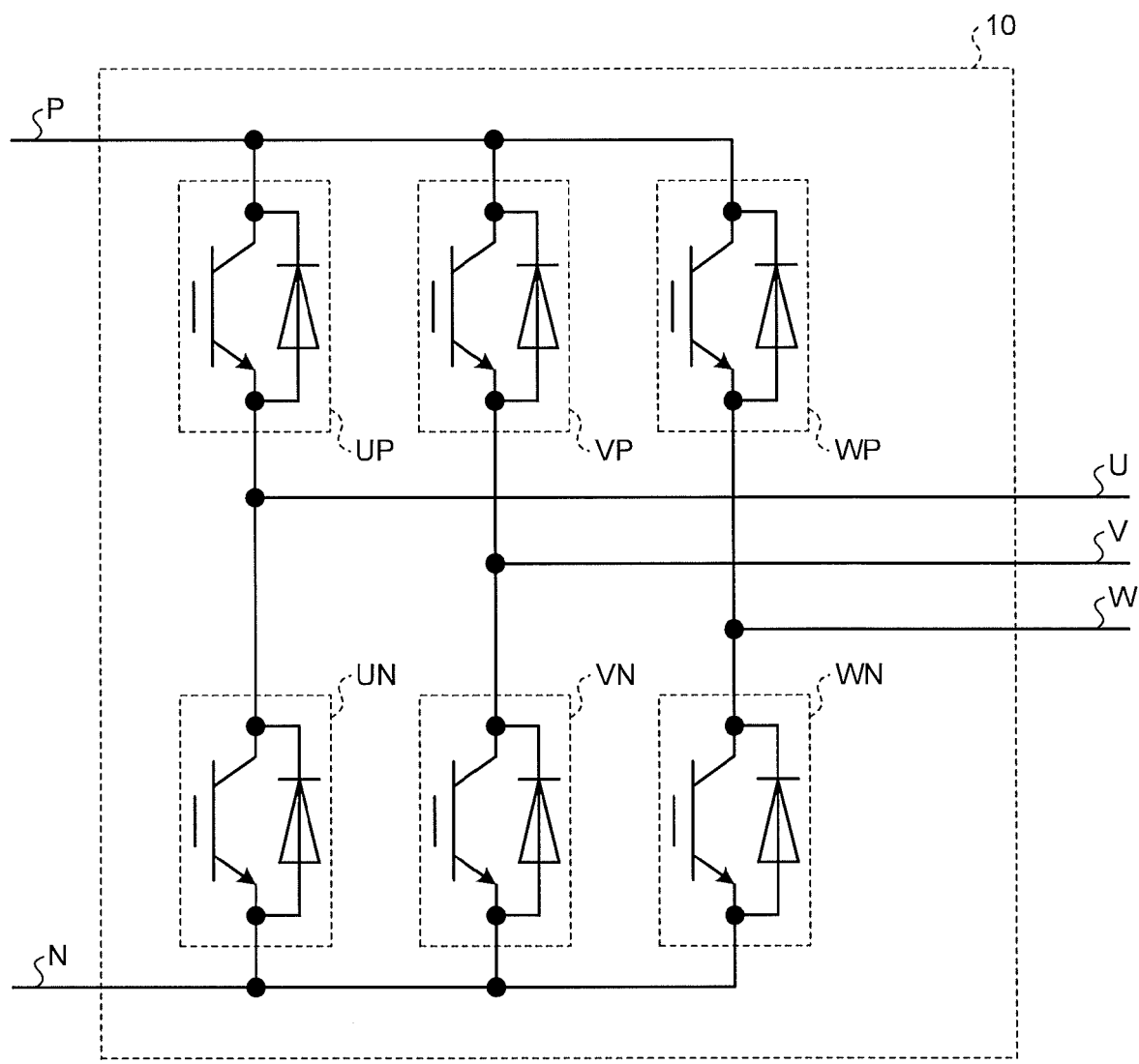
FIG. 2 is a circuit diagram of a configuration example of an inverter shown in FIG. 1.

A voltage source PWM inverter is suitable for use as the inverter 10. FIG. 2 is a circuit diagram of a configuration example of the inverter shown in FIG. 1. FIG. 2 is an example of an inverter circuit as relevant parts of the voltage source PWM inverter.

As shown in FIG. 2, for example, the inverter 10 is a so-called three-phase two-level inverter circuit. That is, the inverter 10 is configured by a bridge circuit of three switching elements (a U-phase upper-arm element UP, a V-phase upper-arm element VP, and a W-phase upper-arm element WP) of a positive-side arm connected to the positive-electrode-side conductor P, and three switching elements (a U-phase lower-arm element UN, a V-phase lower-arm element VN, and a W-phase lower-arm element WN) of a negative-side arm connected to the negative-electrode-side conductor N. An anti-parallel diode is connected to each of the switching elements. A connection point of an upper-arm element and a lower-arm element of each phase constitutes an output terminal of three phases, and A U-phase conductor U, a V-phase conductor V, and a W-phase conductor W are connected to respective output terminals. While respective switching elements are shown as well-known IGBTs in FIG. 2, these switching elements can be those other than the IGBTs. While a three-phase two-level inverter circuit is shown in FIG. 2, the circuit can be a multi-level inverter circuit such as a three-level inverter circuit.

Although not shown in FIG. 2, a drive circuit that receives a gate signal GS output from the controller 15a to the inverter 10 in FIG. 1 is present in the inverter 10. The drive circuit has a configuration of individually on/off-controlling each of the switching elements according to the gate signal GS, and a configuration of outputting a gate feedback signal GF that indicates an operation state of each of the switching elements to the controller 15a.

The U-phase conductor U, the V-phase conductor V, and the W-phase conductor W connected to three-phase output terminals of the inverter 10 are connected to the alternating-current motor 5 via the contactor 14a. With this configuration, the inverter 10 converts an input direct-current voltage into a three-phase alternating-current voltage of an arbitrary frequency by on/off-operating each of the switching elements of the inverter circuit according to the gate signal GS input from the controller 15a, and drives the alternating-current motor 5 via the contactor 14a. The alternating-current motor 5 is configured to drive and run an electric vehicle by rotating the mechanically coupled wheels 4.

The gate signal GS output from the controller 15a to the inverter 10 is generated in the controller 15a based on a basic gate signal GC input from an external control device (not shown) and based on soundness of the power conversion device 1a. The generation of the gate signal GS is described later.

The current detectors 11, 12, and 13 are provided in the U-phase conductor U, the V-phase conductor V, and the W-phase conductor W between the three-phase output terminals of the inverter 10 and the contactor 14a, respectively. A U-phase current IU detected by the current detector 11, a V-phase current IV detected by the current detector 12, and a W-phase current IW detected by the current detector 13 are input to the controller 15a, respectively. While FIG. 1 depicts a configuration of the current detectors that detect three-phase output currents of the inverter 10, respectively, the current detectors can be configured to detect arbitrary two-phase currents. The current of other one phase for which a current detector is not provided can be calculated.

In the first embodiment, the contactor 14a provided between the three-phase output terminals of the inverter 10 and the alternating-current motor 5 is an alternating current disconnecting contactor. When an input signal MKC from the controller 15a is in an on state, a closing coil is excited, and main contacts provided in three phases are closed. When the input signal MKC is in an off state, the closing coil is not excited, and the main contacts are released and opened.

It is preferable that a vacuum contactor applied with a system of interrupting a current at a zero-crossing point of the alternating current is used for the contactor 14a. The vacuum contactor has a contact to open and close the main circuit incorporated in a vacuum valve. Therefore, the contact is stable without adhesion of dusts to the contact, and thus maintenance work can be omitted. Because arc is not discharged to outside, provision of an arc space around the contactor is not necessary. Because any arc chute is not present, the contactor can be compact and light weight. Consequently, the power conversion device can be compact and light weight.

The input signal MKC output from the controller 15a to the contactor 14a is generated in the controller 15a based on the phase currents IU, IV, and IW of three phases detected by the three current detectors and a basic contactor operation instruction MKC0 input from an external control device (not shown). The generation of the input signal MKC is described later.

A rotation state of the alternating-current motor 5 is detected by a rotation detector 16, and is input to the controller 15a. A so-called sensorless control system that controls the alternating-current motor 5 without using the rotation detector 16 has been utilized in practice. When the sensorless control system is employed, the rotation detector 16 becomes unnecessary. A voltage detector can be provided at an input stage or an output stage of the contactor 14a, and an output voltage of the inverter 10 or a terminal voltage of the alternating-current motor 5 can be detected and input to the controller 15a.

In the present embodiment, as described above, a permanent-magnet synchronous motor is assumed as the alternating-current motor 5. Because a motor in a mode having a permanent magnet embedded into a rotor of an induction motor is present, for example, the present invention can be also applied to such a motor having a permanent magnet incorporated in a rotor, other than a permanent-magnet synchronous motor.

As described above, the present inventor found that, depending on a mode of a fault occurred in the power conversion device 1a, a fault current flowing between the inverter 10 in the power conversion device 1a and the motor 5 contains a direct-current component that does not generate a continuous current zero point. The controller 15a is configured to enable the alternating current disconnecting contactor 14a to perform a closing operation even when a fault current that does not generate a current zero point is present, based on the three-phase currents IU, IV, and IW detected by the current detectors 11, 12, and 13, the gate signal GS to the inverter 10, the gate feedback signal GF from the inverter 10, and the basic gate signal GC and the basic contactor operation instruction MKC0 from an external control device (not shown).

To facilitate the understanding, an occurrence mode of a fault current that does not generate a continuous current zero point is explained first in detail, and then a configuration and operation of the controller 15a are explained in detail.

As an occurrence mode of a fault current that does not generate a continuous current zero point, an arbitrary one of six switching elements of three positive-side arm elements (the U-phase upper-arm element UP, the V-phase upper-arm element VP, and the W-phase upper-arm element WP) connected to the positive-electrode-side conductor P and three negative-side arm elements (the U-phase lower-arm element UN, the V-phase lower-arm element VN, and the W-phase lower-arm element WN) connected to the negative-electrode-side conductor N remains in an on-operation state due to a short-circuit fault or a fault of a switching element or its drive circuit (not shown).

For example, there is explained a case that the power conversion device 1a is in operation and the alternating-current motor 5 is rotating, and in this state, the U-phase upper arm element UP generates a short-circuit fault, and rest of the switching elements (VP, WP, UN, VN, and WN) are all in an off-operation state due to a fault detection function (not shown). In this case, a fault current flows between the alternating-current motor 5 and the inverter 10, through the U-phase upper arm element UP remaining in the on-operation state due to the short-circuit fault and through antiparallel diodes connected to rest of the switching elements (VP, WP, UN, VN, and WN). In this case, the waveform of a fault current in each phase is as shown in FIG. 3, for example.

Figure 3:
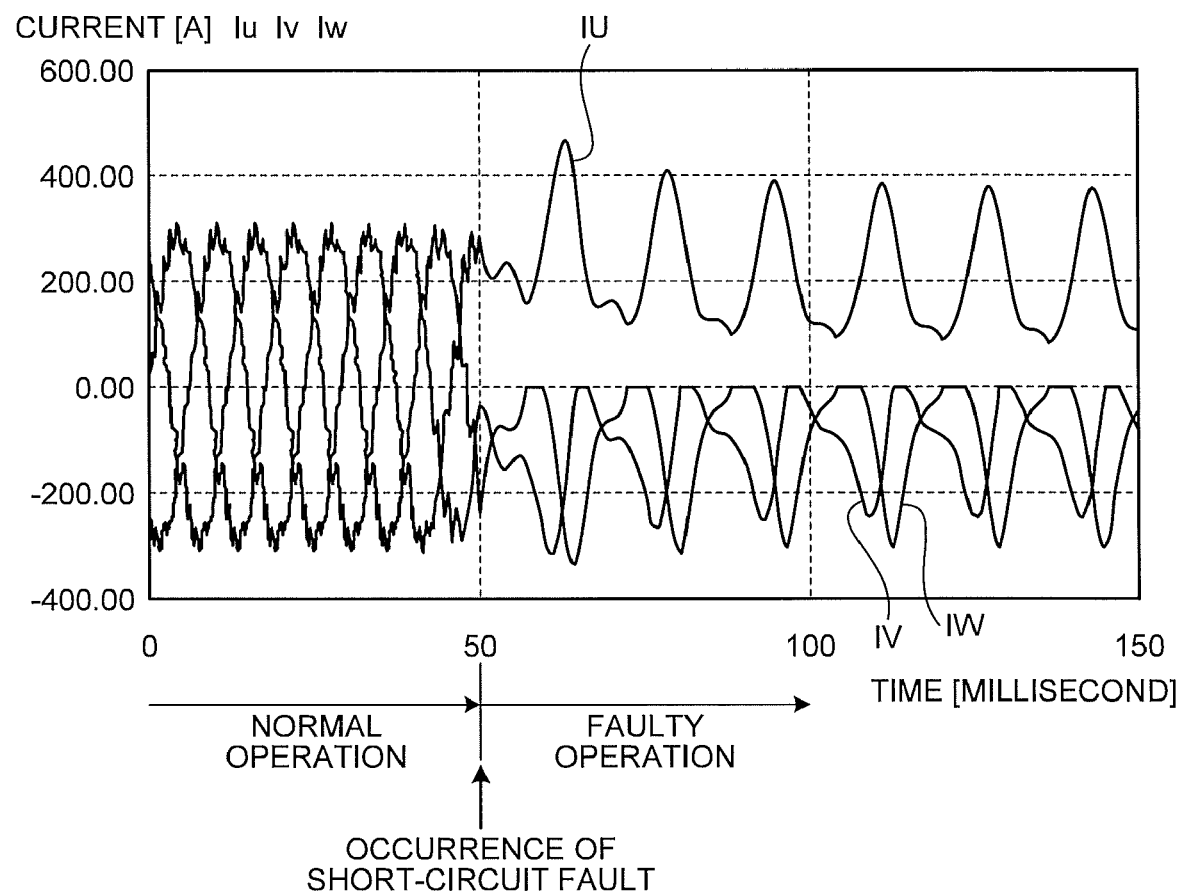
FIG. 3 is a waveform diagram of an example of a fault in which a continuous current zero point is not generated, depicting a current waveform at the time of the fault.

FIG. 3 is a waveform diagram of an example of a current waveform at a time of a fault. FIG. 3 depicts a current waveform when all switching elements of the inverter 10 are in a sound state and the alternating-current motor 5 is in a normal operation, before a time of 50 microseconds. FIG. 3 also depicts current waveforms after the time of 50 microseconds, when the alternating-current motor 5 is in a faulty operation in a state that the U-phase upper arm element UP generates a short-circuit fault and rest of the switching elements (VP, WP, UN, VN, and WM) are all in an off-operation state, at the time of 50 microseconds and while the motor 5 is rotating.

As shown in FIG. 3, the U-phase current IU among the three-phase fault currents IU, IV, and IW is offset to a positive side, and a current zero point is not present. The power conversion device 1a is damaged by the fault current, because, as described above, this fault current is continuously generated while the alternating-current motor 5 is rotating even when switching elements other than that at a fault position are set to an off-operation state. Therefore, the contactor 14a needs to interrupt the fault current. However, because a current zero point is not present in the U-phase current IU, the contactor 14a cannot interrupt the U-phase current IU, even when an opening operation instruction is instructed to the alternate-current interrupting contactor 14a. Consequently, arc is continuously generated between main contacts of the contactor 14a. Because the contactor 14a has a risk of being damaged due to the heat by the arc and due to reduction of a breakdown voltage characteristic between the main contacts, the damage of the power conversion device 1a cannot be avoided. This is the problem to be solved by the present invention.

FIG. 3 depicts a waveform having no presence of a current zero point due to the U-phase current IU offset to a positive side, when the U-phase upper arm element UP generates a short-circuit fault and other elements (VP, WP, UN, VN, and WM) are all in an off-operation state. On the other hand, when the U-phase lower-arm element UN generates a short-circuit fault and when other elements are all in an off-operation state, a waveform is in a state that the U-phase current IU is offset to a negative side and a current zero point is not present. This can be similarly considered when an arm of other phase is in a short-circuit fault state.

That is, what the present inventor has found is an occurrence of a phenomenon of no presence of a current zero point due to an offset to the polarity at a fault arm side of a current in a phase in which an element remains either in a short-circuit fault state or an on-operation state. The controller 15a is configured based on this finding.

Figure 4:
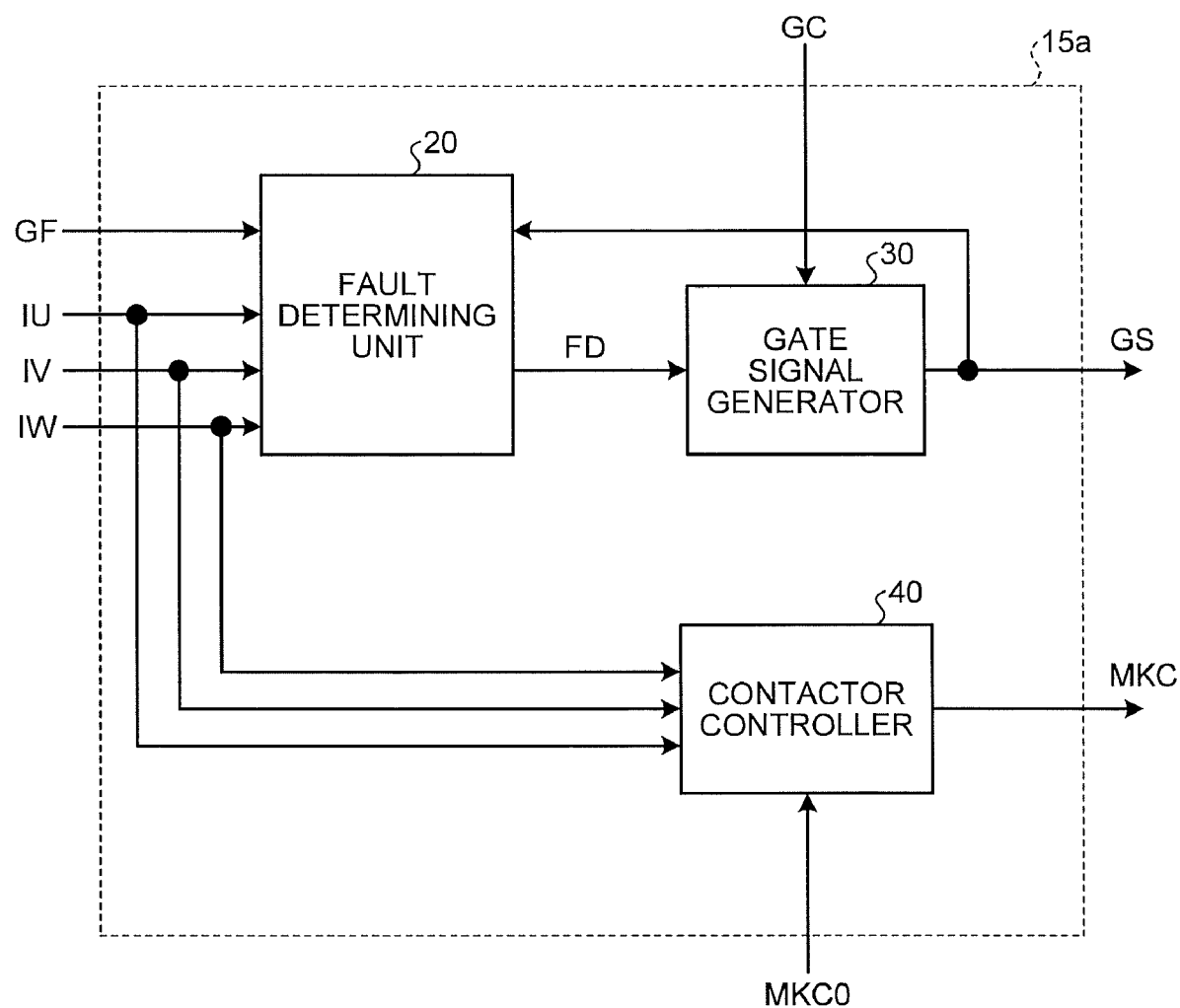
FIG. 4 is a block diagram of a configuration example of a controller shown in FIG. 1.

A configuration and operation of the controller 15a are explained next. FIG. 4 is a block diagram of a configuration example of the controller 15a shown in FIG. 1. As shown in FIG. 4, the controller 15a includes a fault determining unit 20, a gate signal generator 30, and a contactor controller 40.

The fault determining unit 20 is input with detected three-phase currents IU, IV, and IW, the gate feedback signal GF that indicates an operation state of each of switching elements generated by a drive circuit (not shown) in the inverter 10, and the gate signal GS that the gate signal generator 30 outputs to the drive circuit (not shown) in the inverter 10.

Figure 5:
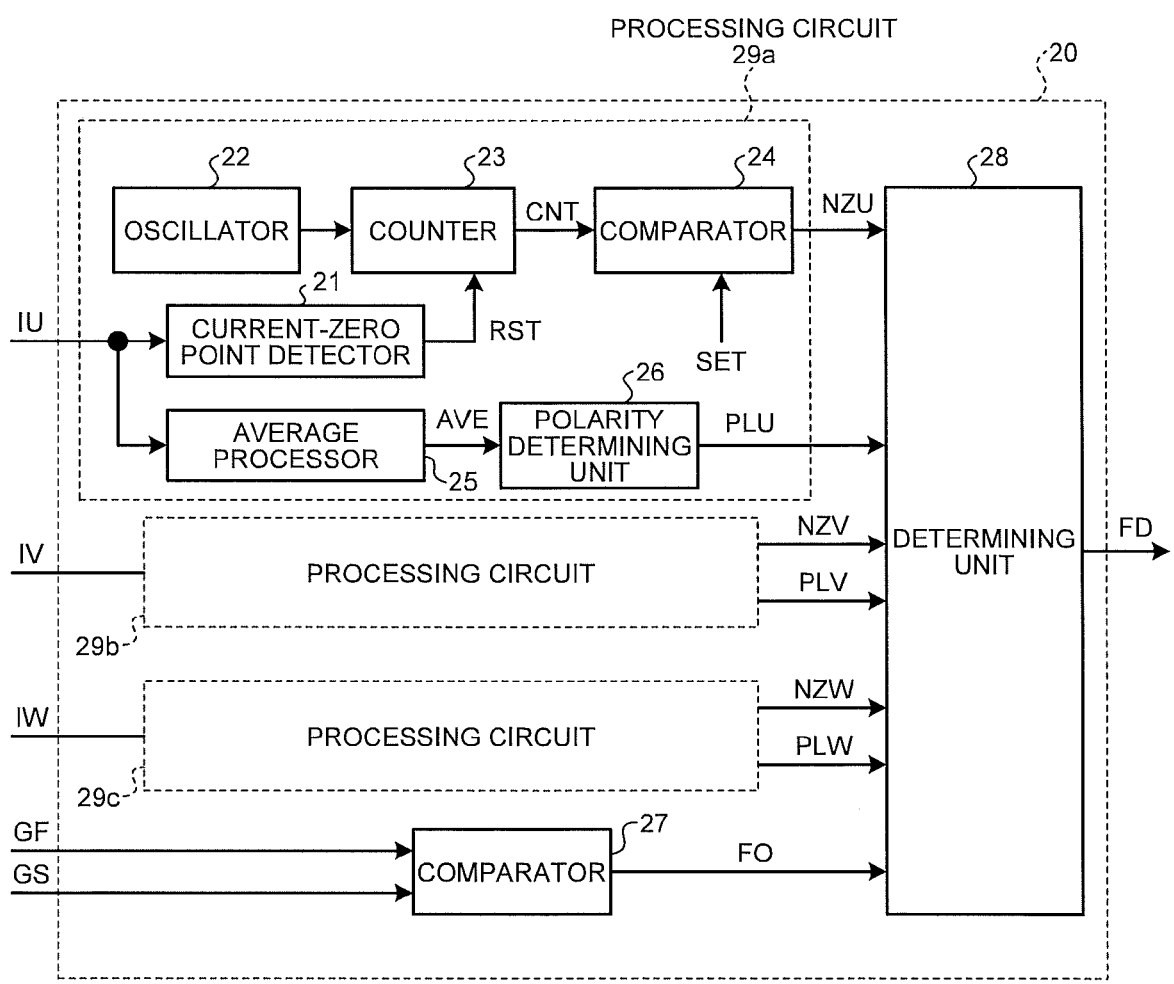
FIG. 5 is a block diagram of a configuration example of a fault determining unit shown in FIG. 4.

The fault determining unit 20 determines an element remaining either in a short-circuit fault state or an on-operation state, among six switching elements of the U-phase upper-arm element UP, the V-phase upper-arm element VP, the W-phase upper-arm element WP, the U-phase lower-arm element UN, the V-phase lower-arm element VN, and the W-phase lower-arm element WN, from these inputs, based on a configuration such as that shown in FIG. 5, and outputs a determination result FD to the gate signal generator 30.

The gate signal generator 30 is also input with the basic gate signal GC from an external control device (not shown), in addition to the determination result FD from the fault determining unit 20. The basic gate signal GC is a signal for specifying an on/off state of the six switching elements of the inverter 10. The external control device (not shown) generates the basic gate signal GC by a method of vector control and the like, to obtain a torque or rotation number of the alternating-current motor 5 necessary at a time of acceleration or deceleration of an electric vehicle.

The gate signal generator 30 outputs the same signal as the basic gate signal GC for the gate signal GS, when the determination result FD is not input from the fault determining unit 20, that is, when it is determined that the inverter 10 is normal. On the other hand, when the determination result FD is input from the fault determining unit 20, as described later, the gate signal generator 30 generates and outputs the gate signal GS for on/off-controlling each of the six switching elements of the inverter 10 by applying three logics (logics 1 to 3).

The contactor controller 40 is input with the detected three-phase currents IU, IV, and IW, and the basic contactor operation instruction MKC0 from an external control device (not shown). The basic contactor operation instruction MKC0 is a binary level signal that instructs a closing operation to the contactor 14a in an on state when the alternating-current motor 5 is in operation, and instructs an opening operation to the contactor 14a in an off state when the operation of the alternating-current motor 5 is stopped or when a fault occurs in the inverter 10.

The contactor controller 40 is configured to perform on/off-control of the input signal MKC synchronously with on and off of the basic contactor operation instruction MKC0 when the inverter 10 is in a sound and normal state, and to set the input signal MKC to off in a condition that generation of a current zero point in each phase is completed, as described later, even when the basic contactor operation instruction MKC0 becomes off when the inverter 10 is in a fault state.

Operations of respective units are explained below. A determination method for the fault determining unit 20 to determine an element remaining either in a short-circuit fault state or an on-operation state is explained first with reference to FIG. 5. FIG. 5 is a block diagram of a configuration example of the fault determining unit 20 shown in FIG. 4.

As shown in FIG. 5, the fault determining unit 20 includes processing circuits 29a, 29b, and 29c of the detected three-phase currents IU, IV, and IW, respectively, a comparator 27 to which the gate feedback signal GF and the gate signal GS are input, and a determining unit 28. The processing circuits 29a, 29b, and 29c have similar configurations, and each of the processing circuits 29a, 29b, and 29c includes a current-zero point detector 21, an oscillator 22, a counter 23, a comparator 24, an average processor 25, and a polarity determining unit 26, as shown in the processing circuit 29a.

The processing circuit 29a for a detected U-phase current IU performs the following operation. A detected U-phase current IU is input to the current-zero point detector 21 and the average processor 25.

The current-zero point detector 21 compares the detected U-phase current IU with a zero line, and when zero-crossing of the U-phase current IU is detected, the current-zero point detector 21 outputs a counter reset signal RST to the counter 23. The counter 23 outputs a count value CNT obtained by counting up an oscillation signal of a constant cycle from the oscillator 22. When the counter reset signal RST from the current-zero point detector 21 is input, the count value CNT is reset to an initial value such as zero.

That is, the counter reset signal RST is not output and the count value CNT of the counter 23 increases, during a period while a zero point is not generated in the detected U-phase current IU. The comparator 24 compares the count value CNT with a set value SET which is set from outside. When the CNT is larger than the SET, the comparator 24 recognizes that a zero point is not generated in a current during a period longer than a set time, and outputs a current-zero-point non-detection signal NZU to the determining unit 28.

When the rotation number of the alternating-current motor 5 decreases, a fundamental wave frequency of a current decreases along with this, and a cycle becomes longer, and thus a time interval for every zero-crossing of a current becomes longer. It is preferable that, naturally, the set value SET is changed according to a rotation frequency of the alternating-current motor 5 or a fundamental wave frequency of a drive current of the alternating-current motor 5, or when the alternating-current motor 5 is operating at a very low speed, the determination result FD output from the determining unit 28 is masked, thereby avoiding an erroneous output of the determination result FD to the gate signal generator 30.

The average processor 25 averages the detected U-phase current IU for every several cycles, and outputs a processed value as an output signal AVE to the polarity determining unit 26. Normally, because the U-phase current IU is an alternating current that zero-crosses in positive/negative symmetry, the output signal AVE of the average processor 25 is zero. On the other hand, when the U-phase current IU does not have a current zero point, an average value of the current is shifted to a positive-value side or a negative-value side. The polarity determining unit 26 determines a positive/negative polarity of an input signal AVE, and outputs a result of determination to the determining unit 28 as a polarity signal PLU.

Detected V-phase current IV and W-phase current IW are also similarly processed by the corresponding processing circuits 29b and 29c. Therefore, the determining unit 28 is input with current-zero-point non-detection signals NZU, NZV, and NZW, and polarity signals PLU, PLV, and PLW in each phase.

The determining unit 28 determines an element remaining either in a short-circuit fault state or an on-operation state, among the six switching elements of the U-phase upper-arm element UP, the V-phase upper-arm element VP, the W-phase upper-arm element WP, the U-phase lower-arm element UN, the V-phase lower-arm element VN, and the W-phase lower-arm element WN, based on these signals, and outputs the determination result FD to the gate signal generator 30.

As described above, a current in a phase in which an element kept in a short-circuit fault state or an on-operation state is present has a phenomenon that the current is offset to a polarity at a fault arm side and has no current zero point. Therefore, the determining unit 28 determines a fault element by using this phenomenon.

That is, the determining unit 28 determines a phase in which a current is offset and has no current zero point among the detected phase-currents IU, IV, and IW, by using the current-zero-point non-detection signals NZU, NZV, and NZW in each phase. At the same time, the determining unit 28 determines whether an offset direction (a polarity) in the corresponding phase is a positive side or a negative side, by using the polarity signals PLU, PLV, and PLW. For example, when the current-zero-point non-detection signal NZU is active and also when the polarity signal PLU is positive, the determining unit 28 determines that the U-phase upper-arm element UP is an element remaining either in a short-circuit fault state or an on-operation state, and outputs this information as the determination result FD.

Next, as shown in FIG. 5, the comparator 27 that detects whether the gate signal GS coincides with the gate feedback signal SG inputs a non-coincidence detection signal FO to the determining unit 28 when these signals do not coincide with each other. Although this process is not necessarily required, it is prepared for an unexpected situation where a fault determination process using the detected phase-currents IU, IV, and IW described above cannot be performed. When the comparator 27 is provided, the determining unit 28 takes a logical sum and outputs the determination result FD.

When each of the switching elements incorporated in the inverter 10 is sound in a normal operation, each of the switching elements performs an on/off-operation synchronously with the gate signal GS. Therefore, the gate feedback signal GF as a feedback signal of the on/off-operation coincides with the gate signal GS. Consequently, the comparator 27 does not output the non-coincidence detection signal FO. However, when a specific switching element remains in an on-operation state regardless of the gate signal GS, due to an occurrence of a fault in a drive circuit or the like set near each of the switching elements, the gate feedback signal GF from the corresponding element remains in an on state regardless of the gate signal GS. Accordingly, the comparator 27 outputs the non-coincidence detection signal FO. This phenomenon is determined with the configuration shown in FIG. 5 and can be included in the determination result FD.

Next, there is explained an operation that the gate signal generator 30 performs to generate and output the gate signal GS to perform on/off-control of each of the six switching elements of the inverter 10 by applying three logics (logics 1 to 3) when the determination result FD is input.

<Logic 1>

When the determination result FD indicates that any one of the U-phase upper-arm element UP, the V-phase upper-arm element VP, and the W-phase upper-arm element WP remains either in a short-circuit fault state or an on-operation state, the gate signal generator 30 outputs the gate signal GS to set all of the U-phase upper-arm element UP, the V-phase upper-arm element VP, and the W-phase upper-arm element WP as upper arm elements to an on-operation state, and set the remaining lower arm elements to an off-operation state.

<Logic 2>

When the determination result FD indicates that any one of the U-phase lower-arm element UN, the V-phase lower-arm element VN, and the W-phase lower-arm element WN remains either in a short-circuit fault state or an on-operation state, the gate signal generator 30 outputs the gate signal GS to set all the U-phase lower-arm element UN, the V-phase lower-arm element VN, and the W-phase lower-arm element WN as lower arm elements to an on-operation state, and set the remaining upper arm elements to an off-operation state.

<Logic 3>

When the determination result FD indicates that any one of the U-phase upper-arm element UP, the V-phase upper-arm element VP, and the W-phase upper-arm element WP remains either in a short-circuit fault state or an on-operation state, and also any one of the U-phase lower-arm element UN, the V-phase lower-arm element VN, and the W-phase lower-arm element WN remains either in a short-circuit fault state or an on state, the gate signal generator 30 outputs the gate signal GS to set all the switching elements to an on-operation state.

In the case of the logic 3, when all the switching elements are in an on-operation state, terminals of capacitors (not shown) and connected between the positive-electrode-side conductor P and the negative-electrode-side conductor N of the inverter 10 are short-circuited, and a charge accumulated in the capacitors is rapidly discharged via the switching elements. Therefore, this has a risk of the switching elements being damaged by an excess current due to this discharge. Accordingly, a breaker (not shown) provided between the power collector 2 and the inverter 10 needs to be set to an open state, by discharging capacitors (not shown) and connected in parallel at a direct-current input side of the inverter 10 by a discharge circuit (not shown). Because a short-circuit current from the alternating-current motor 5 is equal to or smaller than a current normally used, as described above, the switching elements are not damaged.

When the gate signal generator 30 generates a gate signal based on the determination result FD as described above, three-phase fault currents flowing subsequently can be symmetrized, and a current zero point can be generated in the fault currents.

When a fault occurs in the inverter 10, the contactor controller 40 is input with the basic contactor operation instruction MKC0 from an external control device (not shown). At this time, detected three-phase currents IU, IV, and IW do not have a current zero point. Therefore, the contactor controller 40 receives the three-phase currents IU, IV, and IW detected after the gate signal generator 30 generates the gate signal GS according to the logics 1 to 3 as described above, without setting the input signal MKC to off, and sets the input signal MKC to off after confirming that a current zero point is generated in these signals.

As a result, the contactor 14a cancels excitation of the closing coil and opens main contacts, thereby interrupting a fault current flowing between the inverter 10 and the alternating-current motor 5 based on the current zero point as normal. A function of the contactor controller 40 can be provided at a contactor 14a side. In this case, the controller 15a is configured to directly output to the contactor 14a the basic contactor operation instruction MKC0 input from an external control device (not shown).

As described above, according to the first embodiment, even when a fault current flowing between an inverter and an alternating-current motor does not generate a continuous current zero point and contains a direct-current component, a current zero point can be generated by symmetrizing the fault current that does not generate a continuous current zero point. Therefore, the fault current can be interrupted by using an alternating current disconnecting contactor. Consequently, expansion of a fault portion can be prevented even when a fault occurs such as a fault current that does not generate a continuous current zero point occurs.

Because a vacuum contactor as an alternating current disconnecting contactor can be used, a power conversion device can be configured compact and light weight, thereby improving its maintainability.

Second Embodiment

Figure 6:
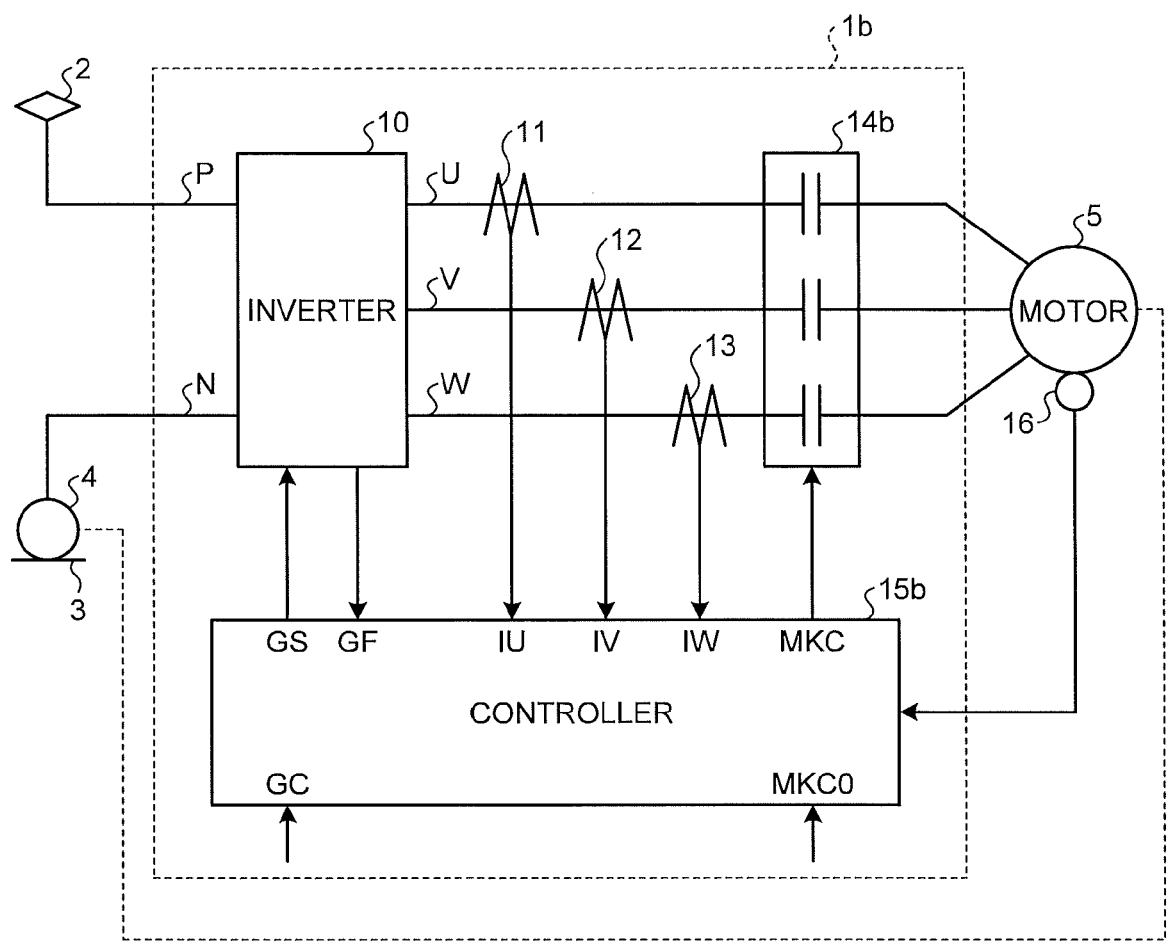
FIG. 6 is a block diagram of a configuration of a power conversion device according to a second embodiment of the present invention that drives a permanent-magnet synchronous motor incorporated in an electric vehicle.

FIG. 6 is a block diagram of a configuration of a power conversion device according to a second embodiment of the present invention that drives a permanent-magnet synchronous motor incorporated in an electric vehicle. In FIG. 6, constituent elements identical or equivalent to the constituent elements shown in FIG. 1 (the first embodiment) are denoted by like reference numerals and explanations thereof will be omitted. Portions relevant to the second embodiment are mainly explained below.

As shown in FIG. 6, a power conversion device 1b according to the second embodiment includes a contactor 14b instead of the contactor 14a and includes a controller 15b instead of the controller 14a, in the configuration shown in FIG. 1 (the first embodiment).

In the first embodiment, it is assumed that one switching element among the six switching elements incorporated in the inverter 10 remains either in a short-circuit fault state or an on-operation state. On the other hand, in the second embodiment, it is assumed that a fault occurs in plural switching elements.

For example, the V-phase upper-arm element VP and the W-phase upper-arm element WP cannot perform an on-operation due to a damage or the like in a state that the U-phase upper-arm element UP remains either in a short-circuit fault state or an on-operation state.

In this case, the V-phase upper-arm element VP and the W-phase upper-arm element WP cannot perform an on-operation, even when the gate signal GS according to <Logic 1> described in the first embodiment is output. Therefore, a current zero point cannot be generated, and the alternating current disconnecting contactor 14a cannot interrupt a fault current.

In the second embodiment, the contactor 14b capable of interrupting a direct-current component is provided instead of the alternating current disconnecting contactor 14a. The contactor 14b capable of interrupting a direct-current component does not have a system of interrupting a current at a current zero point, but is configured to interrupt a fault current by decreasing the fault current by increasing an arc voltage by extending arc generated between contacts by opening the contact in a state that a current is present.

In principle, the contactor 14b capable of interrupting a direct-current component has an arc chute to discharge the arc to outside. Therefore, the contactor 14b needs to be relatively large and have a margin space considering scattering of arc around the contactor 14b. Because a contact is provided at an opened portion, dusts enter, and periodical maintenance is necessary. Therefore, although the power conversion device has a minus aspect of the device being unable to be made compact and light weight and having poor maintainability, a fault current can be interrupted by the basic contactor operation instruction MKC0 input from an external control device (not shown).

Therefore, the basic gate signal GC and the basic contactor operation instruction MKC0 are input to the controller 15b instead of the controller 15a from an external control device (not shown), in a similar manner to that in the first embodiment. However, the controller 15b can be made in a simple configuration by having only a function of outputting the input basic gate signal GC to the inverter 10 as the gate signal GS, and a function of outputting the basic contactor operation instruction MKC0 to the contactor 14b as the input signal MKC.

As described above, according to the second embodiment, when expansion of a fault portion of a power conversion device is prevented by providing a contactor capable of interrupting a direct-current component to prepare for a fault of plural elements, a controller can be made compact at low cost with improved reliability.

As a unit to disconnect the alternating-current motor 5 from the inverter 10, provision of a fuse instead of the contactors 14a and 14b can be considered. However, in the power conversion device of an electric vehicle according to the present invention, functions of the contactors 14a and 14b cannot be substituted by a fuse for the following reasons.

First, as is well known, a fuse cannot interrupt a circuit at a normal time, and cannot be reused once it is melted. In the power conversion device for an electric vehicle according to the present invention, the alternating-current motor 5 and the inverter 10 need to be disconnected from each other, and also need to be connected to each other again in a normal state, other than at a fault time of the inverter 10 as described in the first or second embodiment.

For example, in a case of the power conversion device of an electric vehicle according to the present invention, when a voltage received from the power collector 2 becomes an excess voltage due to an occurrence of a disturbance such as an excess voltage of a trolley voltage and the like, as a protection operation, a capacitor (not shown) present at an input side of the inverter 10 needs to be discharged via a discharging resistor.

In this case, an inductive voltage of the alternating-current motor 5 becomes higher than an input voltage of the inverter 10. Therefore, a current flows from the alternating-current motor 5 to a capacitor at an input side of the inverter 10 or to a discharging resistor, and thus the alternating-current motor 5 needs to generate a brake torque, which is inconvenient, or the discharging resistor may be burnt. To avoid this phenomenon, the alternating-current motor 5 and the inverter 10 need to be disconnected from each other. After the excess voltage state described above is resolved, the alternating-current motor 5 needs to be driven by connecting the alternating-current motor 5 and the inverter 10 to each other. Therefore, the functions of the contactors 14a and 14b cannot be substituted by a fuse.

A short-circuit current generated at a fault time of the inverter 10 is equal to or smaller than a current at a normal time, and there is no fuse that is melted at only a short-circuit time without being melted at the normal time. Therefore, the functions of the contactors 14a and 14b cannot be substituted by a fuse.

The configuration of the first and second embodiments described above is only an example of the contents of the present invention. Therefore, needless to mention, the above configuration can be combined with other known techniques, and modifications such as omitting a part of the configuration can be made without departing from the scope of the present invention.

In addition, in the present specification, the contents of the present invention have been explained by assuming an application thereof to a power conversion device incorporated in an electric vehicle. However, needless to mention, the application field of the present invention is not limited to electric vehicles, and can be also applied to relevant fields such as electric cars.

INDUSTRIAL APPLICABILITY

As described above, the power conversion device according to the present invention is useful to prevent expansion of a fault portion in the power conversion device by interrupting a fault current, not only when a fault occurs in the power conversion device but also when a fault current flowing between an inverter and a motor contains a direct-current component that does not generate a continuous current zero point. Particularly, the power conversion device according to the present invention is suitable when a motor incorporated in an electric vehicle is a permanent-magnet synchronous motor.

The invention claimed is:

1. A power conversion device comprising: an inverter that includes a plurality of switching elements to be on/off-controlled and drives an alternating-current motor by converting a direct-current voltage into an alternating-current voltage of an arbitrary frequency; an alternating current disconnecting switching unit that is connected between the inverter and the alternating-current motor; a current detector that detects an output current of the inverter; and a controller that performs on/off-control of the switching elements in the inverter and switching control with respect to the switching unit, based on at least a current detected by the current detector, wherein
the controller includes: a fault determining unit that determines which one of the switching elements is in a short-cut fault state or remains in an on-operation state, based on a current value detected by the current detector, and outputs a signal indicating a determination result; and a gate signal generator that outputs a control signal to the inverter according to the signal from the fault determining unit, and
the gate signal generator outputs to the inverter an on-control signal of setting all the switching elements to an on-operation state when the signal from the fault determining unit indicates that any of switching elements belonging to an upper arm connected to a positive electrode side remains in a short-cut fault state or an on-operation state, and also indicates that any of switching elements belonging to a lower arm connected to a negative electrode side remains in a short-cut fault state or an on-operation state.

2. The power conversion device according to claim 1, wherein the controller on/off-controls the switching elements in the inverter so as to generate a current zero point in the fault current containing a direct-current component when the fault current is generated between the inverter and the alternating-current motor.

3. A power conversion device comprising: an inverter that includes a plurality of switching elements to be on/off-controlled and drives an alternating-current motor by converting a direct-current voltage into an alternating-current voltage of an arbitrary frequency; an alternating current disconnecting switching unit that is connected between the inverter and the alternating-current motor; a current detector that detects an output current of the inverter; and a controller that performs on/off-control of the switching elements in the inverter and switching control with respect to the switching unit, based on at least a current detected by the current detector, wherein
the controller has a configuration to be able to interrupt a fault current containing a direct-current component by setting the fault current to a state of generating a current zero point when the fault current is generated between the inverter and the alternating-current motor, and outputs an open instruction to the switching unit after confirming a state that a current zero point is generated in the fault current based on a current value detected by the current detector.

4. The power conversion device according to claim 3, wherein the controller on/off-controls the switching elements in the inverter so as to generate a current zero point in the fault current containing a direct-current component when the fault current is generated between the inverter and the alternating-current motor.

5. A power conversion device comprising: an inverter that includes a plurality of switching elements to be on/off-controlled and drives an alternating-current motor by converting a direct-current voltage into an alternating-current voltage of an arbitrary frequency; an alternating current disconnecting switching unit that is connected between the inverter and the alternating-current motor; a current detector that detects an output current of the inverter; and a controller that performs on/off-control of the switching elements in the inverter and switching control with respect to the switching unit, based on at least a current detected by the current detector, wherein
the controller has a configuration to be able to interrupt a fault current containing a direct-current component by setting the fault current to a state of generating a current zero point when the fault current is generated between the inverter and the alternating-current motor, and
the switching unit performs an opening operation after confirming a state that a current zero point is generated in the fault current based on a current value detected by the current detector.

6. The power conversion device according to claim 5, wherein the controller on/off-controls the switching elements in the inverter so as to generate a current zero point in the fault current containing a direct-current component when the fault current is generated between the inverter and the alternating-current motor.

* * * * *